United States Patent [19]

Ueda et al.

[11] Patent Number: 5,604,284

[45] Date of Patent: Feb. 18, 1997

[54] POLYETHERESTERAMIDE AND ANTISTATIC RESIN COMPOSITION

[75] Inventors: Yasuhiro Ueda, Osaka; Eiichi Senda, Kyoto; Yoshitsugu Takai, Kyoto; Tokiko Kokubu, Kyoto; Toshiaki Okamoto, Osaka; Eiji Ichihara, Kyoto, all of Japan

[73] Assignee: Sanyo Chemical Industries, Ltd., Kyoto, Japan

[21] Appl. No.: 464,562

[22] Filed: Jun. 5, 1995

Related U.S. Application Data

[62] Division of Ser. No. 203,399, Mar. 1, 1994.

[30] Foreign Application Priority Data

| Mar. 3, 1993 | [JP] | Japan | 5-67521 |
| Mar. 19, 1993 | [JP] | Japan | 5-85616 |
| Apr. 16, 1993 | [JP] | Japan | 5-113715 |
| Oct. 6, 1993 | [JP] | Japan | 5-276089 |
| Oct. 18, 1993 | [JP] | Japan | 5-283984 |
| Nov. 5, 1993 | [JP] | Japan | 5-301031 |

[51] Int. Cl.$^6$ ................................. C08L 77/12
[52] U.S. Cl. ........................... 524/434; 524/436
[58] Field of Search ...................... 524/434, 436

[56] References Cited

U.S. PATENT DOCUMENTS

| 3,310,909 | 3/1967 | Bennett . | |
| 4,116,943 | 9/1978 | Ducarre | 528/292 |
| 4,172,069 | 10/1979 | Cordes et al. | 524/436 |
| 4,330,457 | 5/1982 | East et al. | 524/602 |
| 4,612,339 | 9/1986 | Giroud-Abel | 524/436 |
| 4,689,393 | 8/1987 | Liedloff | 528/283 |
| 5,096,995 | 3/1992 | Fukumoto et al. | 528/125 |
| 5,169,899 | 12/1992 | Uehara et al. | 525/66 |
| 5,331,061 | 7/1994 | Liedloff | 525/425 |

FOREIGN PATENT DOCUMENTS

| 643304 | 8/1964 | Belgium . |
| 0303489 | 2/1989 | European Pat. Off. . |
| 0419170 | 3/1991 | European Pat. Off. . |
| 60-115627 | 6/1985 | Japan . |
| 62-50329 | 3/1987 | Japan . |
| 6445429 | 2/1989 | Japan . |
| 6462343 | 3/1989 | Japan . |
| 1163234 | 6/1989 | Japan . |
| 3290464 | 12/1991 | Japan . |
| 472855 | 11/1992 | Japan . |
| 5140541 | 6/1993 | Japan . |
| 5295191 | 11/1993 | Japan . |
| 2063279 | 6/1981 | United Kingdom . |
| 2112789 | 7/1983 | United Kingdom . |

Primary Examiner—Ana Woodward
Attorney, Agent, or Firm—Birch, Stewart, Kolasch & Birch, LLP

[57] ABSTRACT

A polyetheresteramide having good heat resistance, permanent antistatic property and superior compatibility with thermoplastic resins and a resin composition containing the polyetheresteramide are disclosed, wherein the polyether-ester-amide consists essentially of a polyamide oligomer with carboxylic chain ends having a number average molecular weight between 200 and 5,000 and a bisphenol compound with oxyalkylene units having a number average molecular weight between 300 and 3,000. Antistatic resin compositions with good antistatic property and heat resistance are obtained from compositions comprising 3 to 40% by weight of the polyetheresteramide and 60 to 97% by weight of thermoplastic resins. The antistatic resin compositions can contain as compatibilizers vinyl polymers having functional groups such as carboxyl and epoxy groups or block polymers containing polyolefin blocks and aromatic vinyl polymer blocks. To further improve the antistatic property of the resin composition a composition comprising at least 97% by weight of the polyetheresteramide and at least 0.01% by weight of an alkali metal or alkaline earth metal halide can be used in the same way as the polyetheresteramide.

14 Claims, No Drawings

POLYETHERESTERAMIDE AND ANTISTATIC RESIN COMPOSITION

This application is a divisional of copending application Ser. No. 08/203,399, filed on Mar. 1, 1994, the entire contents of which are hereby incorporated by reference.

BACKGROUND OF THE INVENTION

1. Field of the Invention

This invention is relates to a polyetheresteramide and antistatic resin compositions compounded therewith. More particularly, he invention relates to a polyetheresteramide with high heat resistance, permanently antistatic property and superior compatibility with thermoplastic resins, and anti-static resin compositions compounded therewith.

2. Description of the Related Art

Polyetheresteramide has been known as an antistatic agent for thermoplastic resins. For example, GBP2063279 discloses a polyetheresteramide synthesized from polyamide forming components, polyoxyalkylene glycols and dicarboxylic acids. USP 5096995 describes a transparent polyetheresteramide obtained by the polycondensation of polyamide forming components, polyoxyalkylene polyols of relatively low molecular weight containing aromatic rings such as alkylene bisphenyl group, polyoxylene glycols and dicarboxylic acids. In EP 303489 and GBP 2112789 is described a resin composition consisting of a polyetheresteramide containing polyoxyalkylene chains and a matrix resin such as ABS resin or polyolefin. Furthermore, JPA 3-290464 discloses a thermoplastic resin composition consisting of a potyetheresteramide synthesized by using polyoxyalkylene glycols and polyolefins modified with acid anhydride, and USP 5169899 discloses a thermoplastic resin composition consisting of a polyetheresteramide synthesized by using polyoxyalkylene glycols and styrene copolymers modified with rubber. JPA 1-163234 describes a thermoplastic resin composition consisting of a polyetheresteramide synthesized by using polyoxyalkylene glycols, polyolefins and modified polyolefins having functional groups such as carboxyl and amino groups. In JPB 4-72855 is described a thermoplastic resin composition consisting of a polyetheresteramide synthesized by using polyoxyethylene glycols, ABS resin and modified polyvinyl polymers containing carboxyl groups. JPA 64-62343 discolses a resin composition consisting of polyamide elastomers such as polyetheresteramide, antistatic agents, alkali metal salts and elastomeric polyolefins which are grafted with a combination of vinyl monomers containing functional groups such as methacrylic acid and a maleimide compound or styrene.

However, the polyetheresteramides or the resin compositions compounded therewith which are described in the references cited above in no way exhibit well-ballanced antistatic property, heat resistance, moldability and compatibility with thermoplastic resins. For example, the polyetheresteramide described in GBP 2063279 has a poor heat resistance, because of the polyether component originating from polyoxyalkylene glycol contained in the polymer. Therefore, the polyetheresteramide partially decomposes by heat, when compounded with a thermoplastic resin and molded. The molded articles thus obtained are not satisfactory in mechanical strength, appearance and antistatic property. Furthermore, the poor compatibility of the polymer with theromplastic resins has a disadvantage of requiring a large amount of compatibilizer when it is compounded with thermoplastic resins. The polyetheresteramide disclosed in USP 5096995 has an improved compatibility with matrix resins, because of the polymer-component of a relatively low molecular weight polyoxyalkylene polyol with aromatic rings. However, as antistatic property is imparted to the polyetheresteramide by the polyoxyalkylene glycol structure in the polymer chain, not only the antistatic performance but also the heat resistance of the polymer is insufficient. The polyetheresteramide described in JPA 64-62343 has an improved antistatic property, however, exhibits an insufficient heat resistance, because the polymer is composed of a polyoxyalkylene glycol with no aromatic rings and a polyamide component, as in the case of the polyetheresteramide described in GBP 2063279.

SUMMARY OF THE INVENTION

An object of the invention is to provide a polyetheresteramide with superior heat resistance, permanent antistatic property and compatibility with thermoplastic resins. Another object of the invention is to provide an antistatic resin composition with superior permanently antistatic property, mechanical strength and moldability.

The polyeteresteramide of the invention consists essentially of the two components of a polyamide oligomer with carboxyl chain ends having a number average molecular weight from 200 to 5,000 and a bisphenol compound containing oxyalkylene units and having a number average molecular weight from 300 to 3,000. By admixing from 3 to 40% by weight of the polyetheresteramide with from 60 to 97% by weight of a thermoplastic resin, an antistatic resin composition with superior antistatic property and heat resistance can be obtained.

To improve the compatibility of the polyetheresteramide with the thermoplastic resin, the antistatic resin composition can be admixed as a compatibilizer with a vinyl polymer having a functional group selected from carboxyl, epoxy, amino, hydroxyl, polyoxyalkylene, sulfonic and sulfonate groups, or a block polymer containing a polyolefin block and an aromatic vinyl polymer block. Furthermore, a resin composition comprising at least 97% by weight of the polyetheresteramide and at least 0.01% by weight of a halide of an alkali metal or an alkaline earth metal can be used in the same way as the polyetheresteramide, with an improved antistatic property of the antistatic resin composition as compared with the composition in which only the polyetheresteramide is included. Detailed Description Of The Invention First, the polyetheresteramide of the present invention is explained in detail.

The polyetheresteramide of the present invention consists essentially of the two components of a polyamide oligomer with carboxylic chain ends having a number average molecular weight from 200 to 5,000 and a bisphenol compound containing oxyalkylene units and having a number average molecular weight from 300 to 3,000. By the term "essentially" as mentioned herein it should be understood that although the polyetheresteramide of the present invention is practically composed of the two components explained above, it is allowed to add a third component to the polymer within the range not deteriorating the object and the advantageous effect of the invention, more perticularly the heat resistance and the compatibility with thermoplastic resins, of the polyetheresteramide of the present invention.

The polyetheresteramide of the present invention, unlike the polyetheresteramide disclosed in the references cited above which have been synthesized by using polyoxyalkylene glycol, does not contain polyoxyalkylene a glycol constituent, thereby obtaining an improvement in the characteristics of the antistatic resins. The polyetheresteramide of the present invention is superior in heat resistance to the polyetheresteramides previously disclosed and, furthermore, exhibits a well-balanced antistatic property, heat resistance and compatibility with thermoplastic resins, which are effected by the use of bisphenol compounds with molecular weights of a certain range, thereby effectively improving the characteristics of antistatic resin compositions. In the following explanation of the invention, the term polyetheresteramide means the polyetheresteramide of the present invention, unless otherwise stated.

Compounds used to form the polyamide oligomers mentioned above are amino carboxylic acids, lactams and salts of diamines and dicarboxylic acids. Examples of amino carboxylic acids are $\omega$-amino caproic acid, $\omega$-aminoenanthic acid, $\omega$-aminocaprylic acid, $\omega$-aminoperalgonic acid, $\omega$-aminocapric acid, 11-aminodecanoic acid and 12-aminodecanoic acid. Examples of lactams are caprolactam, enantholactam, caprylolactam and laurolactam. Diamines as the components of the salts mentioned above are hexamethylene diamine, heptamethylene diamine, octamethylene diamine and decamethylene diamene, and dicarboxylic acids are adipic acid, azelaic acid, sebacic acid, undecane dicarboxylic acid, dodecane dicarboxylic acid and isophthalic acid. Preferable among these compounds are caprolactam, 12-aminododecanoic acid and salt of adipic acid and hexamethylene diamine.

Polyamide oligomers with carboxylic chain ends having a number average molecular weight from 200 to 5,000 are obtained by the ring opening polymerization or polycondensation of the polyamide forming components in the presence of a molecular weight modifier. As molecular weight modifier dicarboxylic acids with from 4 to 20 carbons are usually used, more specifically aliphatic dicarboxylic acids such as succinic acid, glutaric acid, adipic acid, pimelic acid, suberic acid, azelaic acid, sebacic acid, undecane dicarboxylic acid and dodecane dicarboxylic acid; aromatic dicarboxylic acids such as terephthalic acid, isophthalic acid, phthalic acid, naphthalene dicarboxylic acid and 3-sulfoisophthalic acid alkali metal salt; and alicyclic dicarboxylic acids such as 1,4-cyclohexane dicarboxylic acid, dicyclohexyl-4,4'-dicarboxylic acid. Halogeno or sulfoxyl derivatives of these carboxylic acids are also used. Preferable among these compounds are aliphatic dicarboxylic acids and aromatic dicarboxylic acids, more preferable are adipic acid, sebacic acid, terephthalic acid, isophthalic acid and 3-sulfoisophthalic acid alkali metal salt.

Bisphenol compounds, another component of the polyetheresteramide of the invention, are shown by the following formula(1),

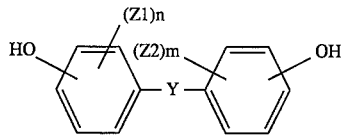

wherein Z1 and Z2 are groups selected from alkyl groups with from 1 to 4 carbons, aralkyl groups with from 6 to 10 carbons, aryl groups and halogen atoms, and Z1 and Z2 may be the same or the different groups.

Y is a covalent bond, an alkylidene group, an aryl alkylidene group, an oxygen atom, a sulfur atom, a sulfonyl group, a bistrifluoromethyl methylene group or a carbonyl group, n and m being integers from 0 to 4.

Examples of the bisphenol compounds are dihydroxydiphenyl, C-alkyl substituted bisphenol; halogenated bisphenol; alkylene bisphenols such as bisphenol F; alkylidene bisphenols such as bisphenol A, cyclohexylidene bisphenol and bistrifluoromethyl methylene bisphenol; aryl alkylidene bisphenol; bisphenol S and hydroxybenzophenone. Preferable among these compounds are alkylidene bisphenols, bisphenol A being more preferable.

The oxyalkylene units which are included in the bisphenol compounds are oxyethylene unit, oxypropylene unit, 1- or 2-oxybutylene unit and oxytetramethylene unit. Preferable among these oxyalkylene units are oxyethylene unit or the combination of oxyethylene and oxypropylene units.

The bisphenol compounds containing oxyalkylene units, namely oxyalkylated bisphenol compounds, which are used for the polyetheresteramide of the invention should have a number average molecular weight ranging from 300 to 3,000, preferably from 1,600 to 3,000. It is particularly preferable to use the bisphenol compounds containing from 32 to 60 oxyethylene units. Using the bisphenol compound having a number average molecular weight smaller than 300 causes an unsatisfactory antistatic property of the polyetheresteramide, while using the bisphenol compound having a molecular weight larger than 3,000 brings about no or little increased improvement in antistatic property, but rather a disadvantage of requiring a prolonged time of manufacturing the polyetheresteramide.

The polyetheresteramide of the invention is obtained by the polycondensation of the above described polyamide oligomer and bisphenol compound in the presence of a known catalyst such as antimony trioxide, monobutyl tin oxide, tetrabutyl titanate, tetrabutyl zirconate and zinc acetate according to need. It is preferable that the bisphenol chains with oxyalkylene units be contained in the amount of from 20 to 80% by weight of the polyetheresteramide. A content of the bisphenol chains less than 20% by weight causes an unsatisfactory antistatic property, while a content more than 80% by weight causes a decrease in heat resistance. The relative viscosity of the polyetheresteramide is preferably in the range from 0.5 to 4.0, more preferably from 0.6 to 3.0. A relative viscosity smaller than 0.5 causes a decrease in heat resistance, while a relative viscosity larger than 4.0 causes an inferior moldability. For the sake of reference the relative viscosity was measured as a 0.5% by weight solution of the polyetheresteramide in m-cresol at 25° C.

The resin composition which comprises at least 97% by weight of the above described polyetheresteramide and at least 0.01% by weight of an alkali metal halide or an alkaline earth metal halide can be used to blend with thermoplastic resins in the same manner as the polyetheresteramide of the invention. Examples of alkali metal halides are lithium chloride, sodium chloride, potassium chloride, sodium bromide and potassium bromide. Examples of alkaline earth metal halides are magnesium chloride, calcium chloride and magnesium bromide. Preferable among these compounds are alkali metal halides, particularly preferable are sodium chloride and potassium chloride. The amount of tile alkali metal halide or alkaline earth metal halide to be used is usually from 0.01 to 3% by weight of, preferably from 0.01 to 2% by weight of, the resin composition of the potyetheresteramide and the halide compounds. The amount of the halide smaller than 0.01% by weight causes an unsatisfactory antistatic property, while the amount larger than 3% by weight causes an undesirable compatibility with the polyetheresteramide, resulting in an inferior appearance of the molded articles. As regards the process of preparing the composition comprising the polyetheresteramide and the halide compound described above, it is preferable to prepare the polyetheresteramide in the presence of the halide compound, whereby the halide compound can be easily dispersed into the polyetheresteramide uniformly.

Next the antistatic resin composition of the invention comprising 8 to 40% by weight of the polyetheresteramide described above and 60 to 97% by weight of thermoplastic resins will be explained. In the following descriptions of the antistatic resin composition of the invention and the antistatic resin composition containing the compatibilizer, the term "polyetheresteramide" should be understood as including the above explained resin compositions comprising the polyetheresteramide and halide compounds, unless otherwise stated.

Examples of the thermoplastic resins to be admixed with the polyetheresteramide are vinyl resins, polyamide resins, polyester resins, polyacetal resins, polycarbonate resins, and copolymer resins of at least two kinds of monomers selected from styrenes, (meth)acrylic esters, (meth)acrylonitrile and butadiene. These resins may be used singly or by being mixed with other resins.

Examples of the vinyl resins are (co)polymers of aliphatic hydrocarbon vinyl monomers, (co)polymers of aromatic hydrocarbon vinyl monomers and (co)polymers of vinyl monomers containing a functional group.

Examples of (co)polymers of aliphatic hydrocarbon vinyl monomers are polyethylene, polypropylene, polyolefins such as copolymers of ethylene and $\alpha$-olefins with from 3 to 30 carbons such as propylene, 1-butene, 4-methyl-1-pentene, 1-pentene, 1-octene, 1-decene and 1-dodecene, and copolymers of propylene and $\alpha$-olefins with from 4 to 30 carbons such as 1-butene, 4-methyl-1-pentene, 1-pentene, 1-octene, 1-decene and 1-dodecene. Preferable among these (co)polymers of aliphatic hydrocarbon vinyl monomers are polyolefins, polypropylene being particularly preferable. Usually polyolefins having a melt flow rate as measured by the method described in JIS K6578 in the range from 0.5 to 150 are used, those having a melt flow rate from 1 to 100 being preferable. Usually used are polyolefins having a degree of crystallization of higher than 25% preferably higher than 30%.

Examples of (co)polymers of aromatic hydrocarbon vinyl monomers are (co)polymers of styrene, alkylstyrenes or halogenostyrenes. Among these (co)polymers polystyrene is preferable.

(Co)polymers of vinyl monomers containing a functional group may be either homopolymers, random copolymers, block copolymers or graft copolymers. As vinyl monomers containing a functional group in (co)polymers of vinyl monomers containing a functional group are, for example, unsaturated carboxylic vinyl esters such as vinyl acetate; acrylic esters such as ethyl acrylate; methacrylic esters such as methyl methacrylate; vinyl cyanides such as acrylonitrile and methacrylonitrile, and halogenovinyl monomers such as chloroprene. Other vinyl monomers which are copolymerized with vinyl monomers containing a functional group are styrene, vinyl toluene and butadiene. As (co)polymers of vinyl monomers containing a functional group preferable are copolymers of at least two monomers selected from styrenes, acrylic esters, methacrylic esters, acrylonitrile and methacrylonitrile.

Examples of (co)polymers of vinyl monomers containing a functional group are polymethyl methacrylate, styrene/acrylonitrile copolymers (SAN resin), acrylonitrile/butadiene/styrene copolymer (ABS resin), methyl methacrylate butadiene/styrene copolymer (MBS resin), styrene/methyl methacrylate/acrylonitrile copolymer, and copolymers of rubber-like polymers such as polybutadiene, polystyrenebutadiene, polyacrylonitrile-butadiene, polyisoprene, polychloroprene, ethylene-propylene-butadiene-terpolymer, polybutyl acrylate and acrylic rubber which are grafted with vinyl monomers containing functional groups mentioned above. Usually (co)polymers of aromatic hydrocarbon vinyl monomers and (co)polymers of vinylmonomers containing a functional group having a melt flow rate as measured by the method described in JIS K6758 in the range from 0.5 to 150 are used, those having a melt flow rate from 1 to 100 being preferable.

As polyamide resins Nylon 46, Nylon 6, Nylon 66, Nylon 69, Nylon 610, Nylon 612, Nylon 11 and Nylon 12 are used. Preferable among these are Nylon 66, Nylon 6 and Nylon 12. Usually used are polyamide resins having a relative viscosity ranging from 0.8 to 5, preferably from 1 to 4, as measured in a solution of 97% sulfuric acid at a concentration of 1 g/100 ml. Polyamide resins having a relative viscosity smaller than 0.8 exhibit a decrease in heat resistance, and those larger than 5 tend to cause an inferior moldability.

Polyester resins used are, for examaple, aromatic polyesters such as polyethylene terephthalate, polybutylene terephthalate and polycyclohexanedimethylene terephthalate, and aliphatic polyesters such as polyethylene adipate, polybutylene adipate and poly $_\epsilon$-caprolactone.

Polyacetal resins used are homopolymers of formaldehyde or trioxane, and copolymers of formaldehyde or trioxane and cyclic ethers such as ethylene oxide, propylene oxide and ethylene glycol formal.

The polyamide resins, polyester resins and polyacetal resins usually used are those having melting points as measured by differential scanning calorimetry in the range from 140° to 270° C., preferably from 150° to 260° C.

Polycarbonate resins used are any known polycarbonates having a bisphenol skeleton such as condensation products of bisphenol A with phosgene and condensation products made by ester exchange reaction of bisphenol A and carbonic acid esters.

When using thermoplastic resins, in particular crystalline polyolefin resins, a combined use of polyamides, polyesters or polyacetals is preferable, because polyetheresteramide is poor in surface orientation. Because the resins mentioned above have crystallization temperatures higher than polyolefin resins, and also have high affinity for polyetheresteramide, the surface orientation of polyetheresteramide can be improved by the combined use of these resins, whereby desired antistatic property being effected with a small amount of polyetheresteramide.

When using as thermoplastic resins of the composition non-crystalline copolymers of at least two kinds of monomers selected from styrenes, (meth)acrylic esters, (meth)acrylonitrile and butadiene, a combined use of polycarbonate resins is preferable for the purpose of improving the compatibility with polyetheresteramide and the heat resistance of the resin composition.

Furthermore, the antistatic resin composition comprising polyetheresteramide and thermoplastic resins can be added with a compatibilizer, in order to obtain an improved compatibility of the resins, prevent interlaminar peeling of the molded articles obtained, and improve the mechanical strength and appearance of the molded articles. As compatibilizers either copolymers containing at least one of functional groups selected from carboxyl, epoxy, amino, hydroxyl, polyoxyalkylene, sulfonic and sulfonate groups, or block polymers having a polyolefin block and an aromatic vinyl polymer block are preferable.

The compatibilizer consisting of vinyl polymers containing a functional group mentioned above can be obtained by (co)polymerizing these vinyl monomers without functional groups mentioned above in the presence of these chain transfer agents containing functional groups above-mentioned, copolymerizing the vinyl monomers containing functional groups with vinyl monomers without functional groups, or graft polymerizing vinyl monomers containing functional groups on vinyl resins such as polyolefin resins.

Examples of vinyl monomers without functional groups are aromatic vinyl monomers such as styrene, $\alpha$-methylstyrene, dimethylstyrene, t-butylstyrene, vinyltoluene, acetoxystyrene, (meth)acrylic esters such as methyl (meth)acrylate, ethyl (meth)acrylate, butyl (meth)acrylate, vinyl cyanides such as (meth)acrylonitrile, dienes such as butadiene, isoprene and chloroprene, and vinyl esters of unsaturated carboxylic acids such as vinyl acetate.

Chain transfer agents containing functional groups are, for example, thioglycerine, mercaptoethanol and aminoethane thiol.

Examples of vinyl monomers containing functional groups are vinyl monomers containing a carboxyl group such as maleic acid(anhydride), (meth)acrylic acid, fumaric acid, itaconic acid(anhydride) and citraconic acid(anhydride); vinyl monomers containing an epoxy group such as glycidyl methacrylate and glycidyl ethacrylate; vinyl monomers containing an amino group such as aminoethyl (meth)acrylate and aminomethyl (meth)acrylate; vinyl monomers containing a hydroxyl group such as 2-hydroxyethyl methacrylate and 2-hydroxyethyl acrylate; vinyl monomers containing a sulfonic or sulfonate groups such as p- or o-styrene sulfonic acid or salts thereof, styrene disulfonic acid or salts thereof, $\alpha$-methylstyrene sulfonic acid or salts thereof, vinylphenylmethane sulfonic acid or salts thereof, vinylsulfonic acid or salts thereof, (meth)allylsulfonic acid or salts thereof, and, furthermore, (meth)acrylate monomers containing sulfonic or sulfonate groups as expressed by the general formula (2). Salts of these sulfonic acids may be alkali metal, alkaline earth metal, ammonium and organic amine salts.

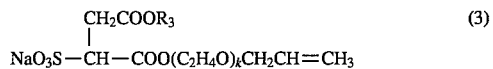

wherein $R_1$ is a hydrogen atom or a methyl group $R_2$ is a hydrocarbon group with from 1 to 24 carbon atoms which may contain oxyalkylene units A is an alkylene group with from 2 to 4 carbon atoms M is an alkali metal ion, alkaline earth metal ion, ammonium ion or organic ammonium ion n is an integer from 0 to 50 m is the valence of M

In compounds expressed by the general formula (2) $R_2$ may be an alkyl group such as methyl, ethyl, octyl, decyl, dodecyl, tridecyl and stearyl groups, an alkenyl group such as allyl, methallyl and oleyl groups, a cycloalkyl group, an aryl group, an aralkyl group, an alkyl mono- or polyoxyalkylene group, a phenyl mono- or polyoxyalkylene group, an alkylcarbonyl mono- or polyoxyalkylene group, an aminoalkylene mono or polyoxalkylene group. These groups may be combined with groups such as hydroxyl, halogen atom, carboxyl, nitrile, amide or amino groups. Preferable among these compounds are alkyl groups with from 8 to 18 carbon atoms.

Examples of A may be ethylene, propylene and butylene groups, preferable among these being ethylene group.

Examples of M may be an alkali metal ion such as sodium, potassium and lithium, an alkaline earth metal ion such as calcium and magnesium, ammonium, hydroxyethyl ammonium, bishydroxyethyl ammonium, monomethyl ammonium and trimethyl ammonium. Among these ions sodium, potassium and ammonium ions are preferable.

(Meth)acrylate monomers mentioned above containing sulfonate groups may be, for example, sodium 3-(meth)acryloyl oxypropane-1-sulfonate, sodium 4-(meth)acryloyl oxybutane-1-sulfonate, sodium 4-(meth)acryloyl oxybutane-2-sulfonate and sodium 3-(meth)acryloyl oxy-2-hydroxypropane-1-sulfonate.

(Meth)acrylamides containing a sulfonic or sulfonate group are, for example, 2-(meth)acrylamide-2-methylpropane sulfonic acid or salts thereof, 2-(meth)acrylamide propane-1-sulfonic acid or salts thereof, 2-(meth)acrylamide ethyl-1-sulfonic acid or salts thereof, 3-(meth)acrylamide-2-hydroxypropane sulfonic acid or salts thereof and p-(meth)acrylamide methylbenzene sulfonic acid or salts thereof.

Among the (meth)acrylate monomers containing a sulfonic or sulfonate group preferable are the compounds expressed by the general formula (2), particularly preferable being the compounds which are expressed by the general formula (3),

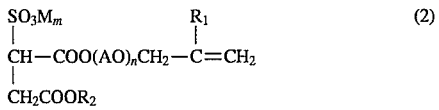

wherein $R_3$ is a hydrocarbon with from 8 to 18 carbon atoms which may contain oxyalkylene units k is an integer from 0 to 3

Compounds expressed by the general formula (3) are commercially available, for example, Eleminol JS-2 (manufactured by Sanyo Chemical Co., Ltd.), wherein $R_3$ is dodecyl group and k is 0.

The number average molecular weights of the (co)polymers obtained by (co)polymerizing vinyl monmers without functional groups in the presence of chain transfer agents containing functional groups or copolymers obtained by copolymerizing these vinyl monomers containing functional groups with vinyl monomers without functional groups, which have been both mentioned above, while not being particularly limited, may usually range from 1,000 to 60,000, preferably from 1,000 to 30,000.

The (co)polymers mentioned above can be prepared usually by bulk polymerization, solution polymerization, suspension polymerization and emulsion polymerization methods.

Preferable among the vinyl polymers containing functional groups explained above which are used for compatibilizer, when polyolefin resins are used as thermoplastic resins, are (a) a polyolefin resin containing a carboxyl group having a number average molecular weight from 800 to 25,000 and an acid value from 5 to 150, (b) a polyolefin resin containing a hydroxyl group having a number average molecular weight from 800 to 25,000 and a hydroxyl value from 5 to 150, or (c) a modified polyolefin resin having a number average molecular weight from 1,000 to 28,000 which is obtained by esterifying with polyoxyalkylene mono- or polyol a polyolefin resin containing a carboxyl group having a number average molecular weight from 800 to 25,000 and an acid value from 5 to 150.

Of the three resins described above the polyolefin resin containing a carboxyl group (a) is obtained by reacting a low-molecular weight polyolefin having a number average molecular weight from 700 to 20,000, which is obtained by polymerizing propylene or ethylene or by thermal degradation of a high-molecular weight polypropylene or a high-molecular weight polyethylene, with $\alpha, \beta$-unsaturated carboxylic acid and/or anhydride thereof in the presence of an organic peroxide according to need in solution or in a molten state. There is preferably used a low-molecular weight polyolefin obtained by thermal degradation for ease of the modification reaction. Methods of preparation of the thermally degraded low-molecular weight polyolefins are disclosed, for example, in JPA 3-62804. The $\alpha, \beta$-unsaturated carboxylic acids and/or anhydrides thereof which are used for the modification reaction may be (meth)acrylic acid, maleic acid(anhydride), fumaric acid, itaconic acid(anhydride) and citraconic anhydride, preferable among these being maleic acid(anhydride).

The amount of these compounds used in the modification reaction is usually from 1 to 25% preferably from 3 to 20% on the weight of the thermally degraded or not degraded low-molecular weight polyolefin. The number average molecular weight of the resin (a) obtained by the method described above is usually from 800 to 25,000, preferably from 1,000 to 20,000. A number average molecular weight lower than 800 causes a decrease in heat resistance, while a molecular weight higher than 25,000 causes a poor compatibility and, accordingly, a decrease in the mechanical properties of the molded article. The acid value of the resin (a) is usually from 5 to 150, preferably from 10 to 100. An acid value smaller than 5 brings about a poor compatibility, while an acid value larger than 150 causes a discoloration of the resin composition.

Furthermore, the polyolefin resin containing a hydroxyl group (b) is obtained by an additional reaction of the polyolefin containing a carboxyl group (a) with compounds such as alkanol amines. Examples of alkanol amines are monoethanolamine, monoisopropanolamine, diethanolamine and diisopropanolamine, among which monoethanolamine is preferable. The hydroxyl value of the resin (b) is usually from 5 to 150, preferably from 10 to 100.

The modified polyolefin resin (c) can be obtained by esterifying with polyoxyalkylene mono- or polyol part of or all the carboxylic(anhydride) units of the polyolefin resin containing a carboxyl group (a). The polyoxyalkylene monoor polyols used for the esterification are the compounds such as polyoxyalkylene monools with one hydoxyl group on one chain end which are obtained by adding alkylene oxide to the compounds with active hydrogens such as alcohols such as methanol, ethanol, butanol, octanol, lauryl alcohol and 2-ethylhexyl alcohol, phenols such as phenol, alkyl phenol, naphthol, phenylphenol and benzylphenol and compounds with hydroxyl groups on both ends such as polyethylene glycol and polypropylene glycol. Compounds obtained by substituting the hydroxyl groups of the above-mentioned compounds with amino or epoxy groups may be used in place of the polyoxyalkylene compound.

The number average molecular weights of these polyoxyalkylene compounds are usually from 300 to 5,000. Whereas no particular limitations are set for the rate of the esterification, preferably from 10 to 100% of the carboxylic acid-(anhydride) units of the resin (a) should be esterified. The number average molecular weight of the resin (c) is usually from 1,000 to 28,000, preferably from 1,200 to 25,000. A number average molecular weight lower than 1,000 causes a decrease in heat resistance, while a molecular weight higher than 28,000 brings about a, poor compatibility.

Another compatibilizer of the invention, block polymers having an olefin polymer block and an aromatic vinyl polymer block, are obtained by reacting an olefinic polymer and an aromatic vinyl polymer each containing mutually reactive groups.

Examples of polyolefins to form the polyolefin blocks constituting the block polymers are high-density polyethylene, medium-density polyethylene, low-density polyethylene, polypropylene, polybutene, poly-4-methylpentene-1, ethylenepropylene rubber, ethylene-propylene-butadiene copolymer rubber, copolymers of ethylene and $\alpha$-olefins with more than 3 carbons such as low-crystallinity ethylene-propylene copolymer, copolymers of propylene and $\alpha$-olefins with more than 4 carbons such as propylene-butene copolymer, ethylenevinyl ester copolymers such as ethylene-vinyl acetate copolymer, butyl rubber, butadiene rubber, ethylene-acrylic ester copolymer, and these polymers thermally degraded to have molecular weights thereof reduced, and mixtures of more than two of these polymers.

Thermally degraded polymers are obtained by, for example, thermally degrading polyolefins having number average molecular weights from 50,000 to 150,000 usually at a temperature from 300° to 450° C. in an atmosphere of an inert gas for from 0.5 to 10 hours. Usually the polyolefins are thermally degraded to have number average molecular weights reduced to from 500 to 50,000, preferably to from 1,000 to 20,000. Polyolefins preferable for forming polyolefin blocks are propylene polymers, copolymers of propylene and $\alpha$-olefins with more than 4 carbons, low-density polyethylene, and thermally degraded products of these polymers. More preferable among these are copolymers of propylene and $\alpha$-olefins with more than 4 carbons and thermally degraded products thereof.

As to the aromatic vinyl polymers to form aromatic vinyl polymer blocks, polymers of aromatic vinyl monomers or copolymers of aromatic vinyl monomers with other copolymerizable vinyl compounds are mentioned. Examples of aromatic vinyl compounds are styrene, $\alpha$-methylstyrene, dimethylstyrene, t-butylstyrene, vinyltoluene, chlorovinyltoluene, acetoxystyrene and hydroxystyrene. Other copolymerizable vinyl compounds are (meth)acrylic acid, (meth)acrylic esters and (meth)acrylonitrile. Preferable among these polymers are polystyrene and copolymers of styrene and acrylonitrile.

The number average molecular weights of the aromatic vinyl polymers used, while not being particulaly limited, may usually range from 1,000 to 60,000, preferably from 1,000 to 20,000.

The block polymers described above are obtained by reacting the olefinic polymers and the aromatic vinyl polymers respectively containing mutually reactive groups. Examples of these reactive groups are carboxyl, epoxy, hydroxy and amino groups. Preferable combinations of the reactive groups are carboxyl group with epoxy, hydroxy or amino groups. The content of carboxyl group is from 1 to 25%, preferably from 3 to 20% on the weight of the olefinic polymer or the aromatic vinyl polymer.

As an example of the polymers containing reactive groups, an olefinic polymer with carboxyl groups can be obtained by graft polymerizing an unsaturated carboxylic acid such as maleic acid on an olefinic polymer in the presence of an organic peroxide, while an aromatic vinyl polymer with epoxy groups can be obtained by copolymerizing glycidyl methacrylate and an aromatic vinyl monomer. Further, an aromatic vinyl polymer with hydroxy groups is obtained by polymerizing an aromatic vinyl monomer in the presence of a chain terminator, for example, thioglycerine or mercaptoethanol. An aromatic vinyl polymer with amino groups is obtained by polymerizing an aromatic vinyl monomer in the presence of a chain terminator, for example, aminoethane thiol.

In using the compatibilizer described above more than two kinds may be used together.

In the present invention the amount to be used of the thermoplastic resins descibed above is usually from 60 to 97% on the weight of the polyetheresteramide or the resin composition comprising the polyetheresteramide and halides of alkali metals or alkaline earth metals. Furthermore, the amount to be used of the compatibilizer described above is usually from 0 to 40% on the weight of the antistatic resin composition comprising the polyetheresteramide and the thermoplastic resin or the antistatic resin composition comprising the resin composition which comprising the polyetheresteramide and halides of alkali metals or alkaline earth metals and the thermoplastic resin. Examples of preferable compositions are as follows.

| Constituents | Preferable Range of Composition (% by weight)*1 | More Preferable Range of Composition (% by weight)*1 |
|---|---|---|
| Preferable Composition 1 | | |
| Polyetheresteramide + Metal Salt | 3 ~ 40 | 5 ~ 30 |
| Polyolefin Resin | 55 ~ 95 | 60 ~ 90 |
| Polyester Resin or Polyacetal | 1 ~ 20 | 3 ~ 15 |
| Compatibilizer*2 | 0.2 ~ 20 | 0.5 ~ 10 |
| *1: Percent by weight based on the respective resin composistion | | |
| *2: Vinyl polymer with at least one functional group, particularly polyolefin with at least one functional group | | |
| Preferable Composition 2 | | |
| Polyetheresteramide + Metal Salt | 3 ~ 40 | 5 ~ 30 |
| Polyolefin Resin | 55 ~ 95 | 60 ~ 90 |
| Polyamide Resin | 1 ~ 20 | 3 ~ 15 |
| Compatibilizer*3 | 0.2 ~ 20 | 0.5 ~ 15 |
| *3: Vinyl polymer with at least one functional group, particularly polyolefin with at least one functional group | | |
| Preferable Composition 3 | | |
| Polyetheresteramide + Metal Salt | 3 ~ 40 | 5 ~ 30 |
| Polymer of A*4 | 50 ~ 90 | 60 ~ 90 |
| Compatibilizer*5 | 0.1 ~ 40 | 1 ~ 15 |
| *4: More than 2 monomers selected from styrenes, (meth)acrylic esters, (meth)acrylonitrile and butadiene | | |
| *5: Vinyl polymer with at least one functional group, particularly vinyl polymer with sulfonic groups and/or block polymer having at least one polyolefin block and aromatic vinyl polymer block | | |
| Preferable Composition 4 | | |
| Polyetheresteramide + Metal Salt | 3 ~ 40 | 5 ~ 30 |
| Polycarbonate Resin | 5 ~ 90 | 20 ~ 75 |
| Polymer of B*6 | 5 ~ 90 | 20 ~ 75 |
| Compatibilizer*7 | 0.1 ~ 40 | 1 ~ 15 |
| *6: More than 2 monomers selected from styrenes, (meth)acrylic esters, (meth)acrylonitrile and butadiene | | |
| *7: Vinyl polymer with at least one functional group, particularly vinyl polymer with sulfonic groups and/or block polymer having at least one polyolefin block and aromatic vinyl polymer block | | |

The antistatic resin composition of the present invention is obtained by blending the polyetheresteramide with thermoplastic resins or halides of alkali metals or alkaline earth metals using a known blending machine such as an extruder, a Brabender, a kneader and a Banbury type mixer.

In the present invention the resin composition comprising the polyetheresteramide, halides of alkali metals or alkaline earth metals, and thermoplastic resins is obtained either by blending these components at the same time or by admixing the blend of the polyetheresteramide and the above-mentioned metal halides with the thermoplastic resins. In preparing the antistatic resin composition of the invention, it is more preferable that a compatibilizer is contained in the composition, in which case, considering the dispersibility and the permanently antistatic property and mechanical strength of the molded articles, it is preferable that a blend of a small amount of the thermoplastic resin, the polyetheresteramide, the metal halides and the compatibilizer is first prepared, that is, a masterbatch is prepared, thereafter the rest of the thermoplastic resin being blended therewith.

The resin composition of the invention can be added with other resin additives within the scope not interfering with the objects of the invention. Examples of the additives used are pigments, dyes, fillers, nucleating agents, glass fibers, lubricants, plasticizers, mold lubricants, antioxidants, fire retardants, UV absorbers and surfactants. Preferable among surfactants are anionic surfactants, particularly alkylbenzene sulfonates, alkyl sulfonates and paraffin sulfonates. The amount of these surfactants to be used is usually from 0.01 to 5%, preferably 0.05 to 3% on the total weight of the polyetheresteramide and the metal halides mentioned above.

In the following some of the examples of the invention will be explained in detail by comparing with comparative examples. However, it is to be understood that the invention is not limited to the specific embodiments. In the explanations "part" means part by weight and "%" means % by weight. Physical properties of the polyetheresteramides and the resin compositions finally obtained were measured by the following testing methods.

Temperature of Starting: Measured by TG-DTA

Weight Loss on Heating

Surface Resistivity: Measured by using a megohmmeter (made by Advantest, Inc.) under a predetermined condition Izod Impact Strength: ASTM D255

Tensile Strength: ASTM D638

Flexural Modulus: ASTM D790

Compatibility: Evaluated by bending test pieces made by injection molding and observing the rupture cross-sections Criteria of Evaluation ⊚: Good ○: A little delamination observed X: Numbers of delamination observed, Poor Compatibility

EXAMPLE 1

A blend of 105 parts $\epsilon$-caprolactam, 17.1 parts adipic acid, 0.3 part Irganox 1010 (antioxidant manufactured by Ciba-Geigy, Ltd.) and 6 parts water was contained in a 3 liter stainless steel autoclave, which was then filled with nitrogen replacing air followed by heating at 220° C. under pressure for 4 hours while stirring to obtain 117 parts polyamide oligomer with carboxyl chain ends having a number average molecular weight 1,000 and an acid value 110. The polyamide oligomer was then added with 225 parts ethylene oxide adduct of bisphenol A having a number average molecular weight 2,000 and 0.5 part Zirconium acetate, and the mixture was heated at 245° C. to effect polymerization for 5 hours under reduced pressure lower than 1 mmHg to obtain a viscous polymer. The polymer was then taken-out on a belt in the form of a strand, which was then pelletized to obtain the polyethestermide of the invention. The relative viscosity of the polymer obtained was 2.15 as measured for a 0.5% by weight solution in m-cresol at 25° C. The copolymer composition of the polymer as determined by NMR analysis was as follows.

$\epsilon$-Caprolactam component: 28.5% by weight

Ethylene oxide adduct of bisphenol A component: 67.0% by weight

Adipic acid component: 4.5% by weight

The temperature of starting weight loss on heating of the polyetheresteramide obtained was measured by TG-DTA in nitrogen. Furthermore, using test pieces respectively prepared by injection molding, Izod impact strength according to ASTM D256, tensile strength according to ASTM D638 and surface resistivity by using a megohmmeter (made by Advantest inc.), of the polyetheresteramide was measured. The surface resistivity was measured by using 2 mm thick square test pieces under the conditions of (a) not water washed, wherein square test pieces, after being molded, were held in an atmosphere of 20° C. and 65% RH for 24 hours, and (b) water washed, wherein square test pieces, after being molded, were washed with an aqueous solution of a detergent (Mamalemon manufactured by Lion, Inc.) followed by washing with ion-exchanged water and drying to remove surface moisture, and then held in an atmosphere of 20° C. and 65% RH for 24 hours. The results of the measurements are tabulated in Table 1. The polyetheresteramide is hereafter named A-1.

EXAMPLE 2

A blend of 105 parts $\epsilon$-caprolactam, 17.1 parts adipic acid, 0.3 part Irganox 1010 and 7 parts water was contained in a 3 liter stainless steel autoclave, which was then filled with nitrogen replacing air followed by heating at 220° C. under pressure for 4 hours while stirring to obtain 117 parts polyamide oligomer with carboxyl chain ends having a number average molecular weight 1,100 and an acid value 100. The polyamide oligomer was then added with 225 parts ethylene oxide adduct of bisphenol A having a number average molecular weight 2,000 and 0.5 part Zirconium acetate, and the mixture was heated at 245° C. to effect polymerization for 5 hours under reduced pressure lower than 1 mmHg to obtain a viscous polymer. The polymer was then processed in the same manner as described in Example 1 to obtain the polyetheresteramide of the invention. Physical properties of the polyetheresteramide were measured using the same methods as described in Example 1. The results of the measurements are tabulated in Table 1. The polyetheresteramide is hereafter named A-2.

EXAMPLE 3

A composition of a polyetheresteramide and potassium chloride was obtained by the same method as described in Example 2 except that, when adding an ethylene oxide adduct of bisphenol A and Zirconium acetate, 2 parts potassium chloride was added together. The copolymer composition of the polyetheresteramide obtained as determined by NMR analysis was as follows.

$\epsilon$-Caprolactam component: 28.0% by weight

Ethylene oxide adduct of bisphenol A component: 67.6% by weight

Adipic acid component: 4.4%, by weight

The contents of the polyetheresteramide and potassium chloride as determined by X-ray fluorescence analysis was as follows.

Polyetheresteramide: 99.4% by weight

Potassium chloride: 0.6% by weight

Physical properties of tile polyetheresteramide obtained were measured by the same methods as described in Example 1. The results of the measurements are tabulated in Table 1. The polyetheresteramide is hereafter named A-3.

EXAMPLE 4

A blend of 112 parts $\epsilon$-caprolactam, 105 parts ethylene oxide adduct of bisphenol A having a number average molecular weight 1,000, 15 parts adipic acid, 0.3 part Irganox 1010, 0.5 part Zirconium acetate and 7 parts water was contained in a 3 liter stainless steel autoclave, which was then filled with nitrogen replacing air followed by heating at 220° C. under pressure for 1.5 hours while stirring to obtain a homogeneous solution. It was confirmed that a polyamide oligomer having a number average molecular weight 1,250 and an acid value 90 was formed in the solution. Thereafter the solution was heated at 245° C. to effect polymerization for 3.5 hours under reduced pressure to obtain a viscous polymer. The polymer was then processed in the same manner as described in Example 1 to obtain the polyetheresteramide of the invention. Physical properties of the polyetheresteramide were measured using the same methods as described in Example 1. The results of the measurements are tabulated in Table 1. The polyetheresteramide is hereafter named A-4.

EXAMPLE 5

A composition of a polyetheresteramide and sodium chloride was obtained by the same method as described in Example 4 except that, when adding an ethylene oxide adduct of bisphenol A and Zirconyl acetate, 3 parts sodium chloride was added together. The contents of the polyetheresteramide and sodium chloride as determined by X-ray fluorescence analysis was as follows.

Polyetheresteramide: 98.8% by weight

Sodium chloride: 1.2% by weight

Physical properties of the polyetheresteramide were measured using the same methods as described in Example 1. The results of the measurements are tabulated in Table 1. The polyetheresteramide is hereafter named A-5.

Comparative Example 1

A polyetheresteramide for comparing with the polyetheresteramide of the invention was obtained by the same method as described in Example 1 except that 175 parts polyoxyethylene glycol having a molecular weight 1,500 was used instead of an ethylene oxide adduct of bisphenol A. Physical properties of the polyetheresteramide obtained were measured using the same methods as described in Example 1. The results of the measurements are tabulated in Table 1. The polyetheresteramide is hereafter named A-6.

Comparative Example 2

A polyetheresteramide for comparing with the polyetheresteramide of the invention was obtained by the same method as described in Example 1 except that 175 parts polyoxyethylene glycol having a molecular weight 1,500 was used instead of an ehtylene oxide adduct of bisphenol A and that polymerization was effected by heating for 3 hours. Physical properties of the polyetheresteramide were measured by the same methods as decribed in Example 1. The results of the measurements are tabulated in Table 1. The polyether-esteramide is hereafter called A-7.

Comparative Example 3

A composition of a polyetheresteramide of Comparative example 1 and potassium chloride for comparing with the composition of the invention was obtained by the same method as described in Comparative Example 1 except that, when adding polyoxyethylene glycol and Zirconium acetate, 5 parts potassium choloride was added together. The contents of the polyetheresteramide and potassium choloride as determined by X-ray fluorescence analysis was as follows.

Polyetheresteramide: 98.2% by weight

Potassium Chloride: 1.8% by weight

Physical properties of the polyetheresteramide obtained were measured by using the same methods as described in Example 1. The results of the measurements are tabulated in Table 1. The polyetheresteramide is hereafter named A-8.

In the following explanation the polymers A-1~A-8 will be called (A).

process as described in Example 6 except that the melt kneading of (A) and (B) in the proportions shown in Table 2 was carried out at 250° C.

Examples 12 to 15 and Comparative Example 8

The antistatic resin compositions of the invention and a comparative resin composition were obtained by the same process as described in Example 6 by melt kneading (A) and (B) in the proportions shown in Table 2.

TABLE 2

|  | (A) | | (B) | | Contents of Metal Salts (%) |
| --- | --- | --- | --- | --- | --- |
| Examples | | | | | |
| 6 | A-1 | (15) | B-1 | (85) | — |
| 7 | A-3 | (15) | B-1 | (85) | D-1* (0.09) |
| 8 | A-1 | (15) | B-2 | (85) | — |

TABLE 1

| | Relative Viscosity | Temperature of Starting Weight Loss* (°C.) | Izod Impact Strength (Kg · cm/cm) | Tensile Strength (Kg/cm²) | Surface Resistivity | |
| --- | --- | --- | --- | --- | --- | --- |
| | | | | | Not Water Washed ($\Omega$) | Water Washed ($\Omega$) |
| Example | | | | | | |
| 1 | 2.15 | 360 | Not Broken | 420 | $1 \times 10^9$ | $1 \times 10^9$ |
| 2 | 2.10 | 350 | Not Broken | 400 | $2 \times 10^9$ | $3 \times 10^9$ |
| 3 | 2.10 | 360 | Not Broken | 420 | $1 \times 10^8$ | $1 \times 10^8$ |
| 4 | 1.80 | 340 | Not Broken | 390 | $4 \times 10^9$ | $6 \times 10^9$ |
| 5 | 1.80 | 340 | Not Broken | 390 | $8 \times 10^8$ | $8 \times 10^8$ |
| Comparative Example | | | | | | |
| 1 | 2.20 | 290 | Not Broken | 400 | $5 \times 10^9$ | $5 \times 10^9$ |
| 2 | 1.10 | 260 | Not Broken | 300 | $7 \times 10^9$ | $8 \times 10^9$ |
| 3 | 2.10 | 280 | Not Broken | 370 | $1 \times 10^9$ | $1 \times 10^9$ |

*: Measured under nitrogen stream

Examples 6 to 9 and Comparative Examples 4 to 6

Each polyetheresteramide (A) obtained in the Examples and Comparative Examples described above was blended with each of the following resins B-1 to B-4 for 3 minutes using a Henschel mixer in a proportion shown in Table 2 for each Example. The blends obtained were melt kneaded using a vented double-screw extruder under a condition of 240° C., 30 rpm and a residence time of 5 minutes to obtain the antistatic resin compositions of the invention and resin compositions for comparison.

B-1: ABS resin (JSR-ABS10 manufactured by Japan Synthetic Rubber, Inc.)

B-2: Nylon 6 resin (UBE Nylon 1013B manufactured by UBE Industries, Inc.)

B-3: Polybutylene terephthalate resin (Duranex 2000 manufactured by Polyplastics, Inc.)

B-4: Polypropylene resin (UBE Polypro J609 manufactured by UBE Industries, Inc.)

In the following explanations the above B-1 to B-4 are called (B) unless otherwise stated.

Examples 10,11 and Comparative Example 7

The antistatic resin compositions of the invention and a comparative resin composition were obtained by the same TABLE 2-continued

|  | (A) | | (B) | | Contents of Metal Salts (%) |
| --- | --- | --- | --- | --- | --- |
| 9 | A-3 | (12) | B-2 | (88) | D-1* (0.07) |
| 10 | A-1 | (15) | B-3 | (85) | — |
| 11 | A-3 | (12) | B-3 | (88) | D-1* (0.07) |
| 12 | A-2 | (3) | B-4 | (97) | — |
| 13 | A-4 | (3) | B-4 | (97) | — |
| 14 | A-2 | (20) | B-4 | (80) | — |
| 15 | A-2 | (20) | B-3 | (10) | — |
|  |  |  | B-4 | (70) |  |
| Comparative Examples | | | | | |
| 4 | — | | B-1 | (100) | — |
| 5 | A-6 | (15) | B-1 | (85) | — |
| 6 | A-6 | (15) | B-2 | (85) | — |
| 7 | A-6 | (15) | B-3 | (85) | — |
| 8 | — | | B-4 | (100) | — |

Numbers in Parentheses Denote Proportions of Respective Components in Composition (%)

D-1*: Potassium chloride (added when preparing polyetheresteramide)

Performance Tests

Test pieces were prepared from the resin compositions of Examples 6 to 15 and Comparative Examples 4 to 8 using an injection molding machine under a condition shown in Table 3, which were tested for mechanical properties and antistatic property. The results of tile measurements are tabulated in Tables 4 to 6. Tests for antistatic property were carried out by measuring the surface resistivity of the test pieces after having been treated and conditioned as described in Table 3.

TABLE 3

|  | Injection Temperature (°C.) | Mold Temperature (°C.) | Condition of Surface Resistivity Measurement* |
|---|---|---|---|
| Examples |  |  |  |
| 6 | 220 | 60 | (I) |
| 7 | 220 | 60 | (I) |
| 8 | 240 | 60 | (I) |
| 9 | 240 | 60 | (I) |
| 10 | 250 | 60 | (I) |
| 11 | 250 | 60 | (I) |
| 12 | 240 | 50 | (II) |
| 13 | 240 | 60 | (II) |
| 14 | 240 | 50 | (II) |
| 15 | 240 | 50 | (II) |
| Comparative Examples |  |  |  |
| 4 | 220 | 60 | (I) |
| 5 | 220 | 60 | (I) |
| 6 | 240 | 60 | (I) |
| 7 | 250 | 60 | (I) |
| 8 | 240 | 60 | (II) |

*: (I) Not water washed, wherein the test pieces, after being molded, were held in an atmosphere of 20° C. and 65% RH for 24 hours. Water washed, wherein the test pieces, after being molded, were washed with an aqueous solution of a detergent (Mamalemon manufactured by Lion, Ltd.) followed by washing with ion-exchnaged water and drying to remove surface moisture, and then held in an atmosphere of 20° C. and 65% RH for 24 hours.
(II) Not water washed, wherein the test pieces, after being molded, were held in an atmosphere of 20° C. and 50% RH for 24 hours. Water washed, wherein the test pieces, after being molded, were washed with an aqueous solution of a detergent (Mamalemon manufactured by Lion, Ltd.) followed by washing with ion-exchanged water and drying to remove surface moisture, and then held in an atmosphere of 20° C. and 50% RH for 24 hours.

TABLE 4

|  | Temperature of Starting Weight Loss* (°C.) | Izod Impact Strength (Kg · cm/cm) | Tensile Strength (Kg/cm²) | Surface Resistivity | | Compatibility |
|---|---|---|---|---|---|---|
|  |  |  |  | Not Water Washed ($\Omega$) | Water Washed ($\Omega$) |  |
| Examples |  |  |  |  |  |  |
| 6 | 350 | 28 | 430 | $2 \times 10^{11}$ | $2 \times 10^{11}$ | ◯ |
| 7 | 350 | 32 | 440 | $8 \times 10^{10}$ | $9 \times 10^{10}$ | ◯ |
| Comparative Examples |  |  |  |  |  |  |
| 4 | 350 | 40 | 520 | $10^{16}<$ | $10^{16}<$ | — |
| 5 | 290 | 14 | 320 | $5 \times 10^{11}$ | $5 \times 10^{11}$ | × |

*: Measured under nitrogen stream

TABLE 5

|  | Temperature of Starting Weight Loss* (°C.) | Surface Resistivity | | Compatibility |
|---|---|---|---|---|
|  |  | Not Water Washed ($\Omega$) | Water Washed ($\Omega$) |  |
| Examples |  |  |  |  |
| 8 | 350 | $2 \times 10^{12}$ | $2 \times 10^{12}$ | ◉ |
| 9 | 350 | $3 \times 10^{11}$ | $3 \times 10^{11}$ | ◉ |
| 10 | 350 | $2 \times 10^{12}$ | $2 \times 10^{12}$ | ◉ |
| 11 | 350 | $5 \times 10^{11}$ | $5 \times 10^{11}$ | ◉ |
| Comparative Examples |  |  |  |  |
| 6 | 290 | $6 \times 10^{12}$ | $6 \times 10^{12}$ | ◯ |
| 7 | 290 | $8 \times 10^{12}$ | $8 \times 10^{12}$ | ◯ |

*: Measured under nitrogen stream

TABLE 6

| | Tempera-ture of Starting Weight Loss* (°C.) | Izod Impact Strength (Kg·cm/cm) | Flexural Modulus (Kg/cm²) | Surface Resistivity Not Water Washed (Ω) | Surface Resistivity Water Washed (Ω) | Compati-bility |
|---|---|---|---|---|---|---|
| Examples | | | | | | |
| 12 | 270 | 10 | 11,500 | $1 \times 10^{15}$ | $1 \times 10^{15}$ | × |
| 13 | 265 | 10 | 11,500 | $1 \times 10^{15}$ | $1 \times 10^{15}$ | × |
| 14 | 280 | 8 | 9,000 | $2 \times 10^{13}$ | $1 \times 10^{13}$ | × |
| 15 | 280 | 10 | 10,000 | $1 \times 10^{11}$ | $2 \times 10^{11}$ | × |
| Comparative Examples | | | | | | |
| 8 | 280 | 10 | 12,000 | $10^{16}<$ | $10^{16}<$ | |

*: Measured under air stream

Preparatin of Compatibilizer

Preparation Example 1

A vinyl polymer containing sulfonic groups was obtained by the suspension polymerization of 68 parts methyl methacrylate, 23 parts styrene, 4 parts acrylonitrile and 5 parts of a compound containing sulfonic groups which is expressed by the following formula. The vinyl polymer containing sulfonic groups thus obtained is hereafter named C-1.

Structural Formula

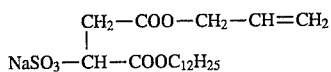

$$\begin{array}{c} CH_2-COO-CH_2-CH=CH_2 \\ | \\ NaSO_3-CH-COOC_{12}H_{25} \end{array}$$

Preparation Example 2

(1) A blend of 95 parts low-molecular weight polypropylene having a number average molecular weight 5,000 and a density 0.92 which was obtained by the thermal degradation of polypropylene and 5 parts maleic anhydride was melted at 180° C. under nitrogen stream, followed by adding a 50% xylene solution in which 1.5 parts dicumyl peroxide are dissolved while dropping over 15 minutes. After the mixture was reacted for 1 hour, an acid modified low-molecular weight polypropylene was obtained by removing the solvent by distillation. The polymer obtained had an acid value of 25.4 and a molecular weight of 7,000.

(2) A styrene polymer containing hydroxyl groups was obtained by dissolving 95 parts styrene monomer in 100 parts xylene at 120° C. under nitrogen, followed by adding 5 parts thioglycerine while dropping over 15 minutes, reacting for 1 hour and then removing the solvent and unreacted monomer by distillation. The polymer obtained had an hydroxyl value of 25.2 and a number average molecular weight of 8,000.

(3) A polypropylene-block-polystyrene needed was obtained by melt kneading 50 parts acid modified low-molecular weight polypropylene (1) and 50 parts styrene polymer containing hydroxyl groups (2) above-mentioned, by using a vented double-screw extruder under a condition of 200° C., 30 rpm and a residence time of 5 minutes. The block polymer thus obtained is thereafter named C-2.

Preparation Example 3

A graft copolymer latex was obtained by the emulsion polymerization of 60 parts monomer mixture consisting of 4% by weight acrylic acid 72% by weight styrene and 24% by weight acrylonitrile in the presence of 40 parts polybutadiene latex. The graft copolymer latex obtained was coagulated by sulfuric acid, neutralized by caustic soda, followed by washing, filtering and drying to obtain a powdery reaction product of the graft copolymer (C-3).

Preparation Example 4

A mixture was obtained by melting a blend of 95 parts low-molecular weight polypropylene having a number average molecular weight 12,000 and a density 0.89 which was obtained by thermally degrading polypropylene and 5 parts maleic anhydride at 180° C. under nitrogen stream, followed by adding a 50% xylene solution in which 1.5 parts dicumyl peroxide are dissolved while dropping over 15 minutes. After the obtained mixture was reacted for 1 hour, an acid-modified low-molecular weight polypropylene was obtained by removing the solvent by distillation. The polymer obtained had an acid value of 25.7 and a number average molecular weight of 15,000. The modified polymer thus obtained is hereafter named C-4.

Preparation Example 5

A modified low-molecular weight polypropylene containing hydroxyl groups was obtained by dissolving 95 parts acid-modified low-molecular weight polypropylene obtained in Preparation Example 4 (C-4) in 100 parts xylene at 120° C. under nitrogen stream, followed by adding 5 parts monoethanolamine while dropping over 15 minutes, reacting for 1 hour and then removing tile solvent and unreacted monoethanolamine by distillation. The polymer obtained had an hydroxyl value 25.2 and a molecular weight 16.000. The modified product thus obtained is hereafter named C-5.

Preparation Example 6

A polyoxyalkylene-modified low-molecular weight polypropylene was obtained by melting a blend of 95 parts acid-modified low-molecular weight polypropylene obtained in Preparation Example 4 (C-4) and 50 parts adduct of 24 mole ethylene oxide to lauryl alcohol at 180° C. under nitrogen stream, followed by an esterification reaction for 5 hours under reduced pressure of 10 mmHg. The polymer obtained had an hydroxyl value of 0.5 and number average molecular weight of 18,000. By a NMR analysis, it was confirmed that the esterification reaction proceeded stoichiometrically. The modified product thus obtained is hereafter named C-6.

Preparation Example 7

An acid-modified low-molecular weight polyethylene was obtained by dissolving a mixture of 38 parts low-molecular weight polyethylene having a number average molecular weight 3,000 and a density 0.93 which was obtained by thermally degrading polyethylene and 2 parts maleic anhydride in 60 parts xylene at 140° C. under nitrogen stream, followed by adding a 50% xylene solution in which 0.3 part di-t-butyl peroxide was dissolved while dropping over 15 minutes, reacting for 2 hours and removing the solvent by distillation. The polymer obtained had an acid value of 28.0 and a number average molecular weight of 3,800. The modified product thus obtained is hereafter named C-7.

In the following explanations the above compounds C-1 to C-7 will be called (C) unless otherwise stated.

Preparation of Master Batches 1

Examples 16 to 19 and Comparative Examples 9 to 12

Polyetheresteramides (A), thermoplastic resins (B) and compatibilizers (C) were blended for 3 minutes in proportions shown in Table 7 for respective examples using a Henschel mixer. The blends obtained were melt kneaded using a vented double-screw extruder under a condition of 240° C., 30 rpm and a residence time of 5 minutes to obtain respective master batches of Examples 16 to 19 and Comparative Examples 9 to 12, which will be called respectively M-1 to M-8 in the following according as they are described in Table 7.

TABLE 7

| Master Batch | (A) A-6 | (A) A-2 | (B) B-1 | (C) C-1 | (C) C-2 |
|---|---|---|---|---|---|
| Com. Ex. 9* | M-1 | 30 | 0 | 60 | 5 | 5 |
| Ex. 16** | M-2 | 0 | 30 | 60 | 5 | 5 |
| Com. Ex. 10 | M-3 | 45 | 0 | 40 | 7.5 | 7.5 |
| Ex. 17 | M-4 | 0 | 45 | 40 | 7.5 | 7.5 |
| Com. Ex. 11 | M-5 | 60 | 0 | 20 | 10 | 10 |
| Ex. 18 | M-6 | 0 | 60 | 20 | 10 | 10 |
| Com. Ex. 12 | M-7 | 75 | 0 | 0 | 12.5 | 12.5 |
| Ex. 19 | M-8 | 0 | 75 | 0 | 12.5 | 12.5 |

Numbers Denote Proportions of Respective Components in Composition (%)

*Com. Ex.: Comparative Example
**Ex.: Example

Examples 20 to 23 and Comparative Examples 13 to 16

The resin compositions of the invention and the compositions for comparison were obtained by blending and kneading masterbatches M-1 to M-8 and B-1 in the same manner as described in Example 16. The constitutions and the proportions of the resin compositions and the compositions for comparison prepared by way of the master batches are tabulated in Table 8.

TABLE 8

| | Master Batch Components Used Numbers in Parentheses Denote Parts By Weight | Proportions of Respective Components in Compositions by Way of Master Batch (%) | | | | | Contents of Metal Salts in Composition (%) |
|---|---|---|---|---|---|---|---|
| | | (A) A-6 | (A) A-3 | (B) B-1 | (C) C-1 | (C) C-2 | D-1* |
| Examples | | | | | | | |
| 20 | M-2 (50) | — | 15 | 80 | 2.5 | 2.5 | 0.09 |
| 21 | M-4 (33.3) | — | 15 | 80 | 2.5 | 2.5 | 0.09 |
| 22 | M-6 (25) | — | 15 | 80 | 2.5 | 2.5 | 0.09 |
| 23 | M-8 (20) | — | 15 | 80 | 2.5 | 2.5 | 0.09 |
| Comparative Examples | | | | | | | |
| 13 | M-1 (50) | 15 | — | 80 | 2.5 | 2.5 | — |
| 14 | M-3 (33.3) | 15 | — | 80 | 2.5 | 2.5 | — |
| 15 | M-5 (25) | 15 | — | 80 | 2.5 | 2.5 | — |
| 16 | M-7 (20) | 15 | — | 80 | 2.5 | 2.5 | — |

D-1: Potassium chloride (added while preparting the polyetheresteramide)

Comparative Examples 17 to 22

Polymers (A), (B) and (C) which are shown in Table 9 were blended and kneaded under tile same condition as described in Example 16 to obtain respective resin compositions of the Comparative Examples.

TABLE 9

| Comparative Examples | (A) A-6 | (B) B-1 | (C) C-1 | (C) C-2 |
|---|---|---|---|---|
| 17 | 15 | 80 | 5 | 0 |
| 18 | 15 | 80 | 0 | 5 |
| 19 | 15 | 80 | 2.5 | 2.5 |
| 20 | 10 | 85 | 2.5 | 2.5 |
| 21 | 20 | 75 | 2.5 | 2.5 |
| 22 | 30 | 65 | 2.5 | 2.5 |

Proportions of Respective Components in Compositions (%)

Performance Tests

Test pieces were prepared by injection-molding the resin compositions of Examples 20 to 23 and Comparative Examples 13 to 21 and compositions for comparison at a cylinder temperature of 220° C. and a mold temperature of 60° C., which were tested for mechanical properties and antistatic property. The results of the measurements are tabulated in Table 10. The tests for antistatic property were carried out by measuring the surface resistivity of the test pieces after having been treated and conditioned as described below.

Not water washed, wherein the test pieces, after having been molded. were held in an atmosphere of 20° C. and 65% RH for 24 hours.

Water washed, wherein the test pieces, after having been molded. were washed with an aqueous solution of a detergent (Mamalemon manufactured by Lion, Inc.) followed by washing with ion-exchanged water and drying to remove surface moisture, and then held in an atmosphere of 20° C. and 65% RH for 24 hours.

TABLE 10

| | Temperature of Starting Weight Loss* (°C.) | Izod Impact Strength (Kg · cm/cm) | Tensile Strength (Kg/cm²) | Surface Resistivity Not Water Washed (Ω) | Surface Resistivity Water Washed (Ω) | Compatibility |
|---|---|---|---|---|---|---|
| Examples | | | | | | |
| 20 | 350 | 41 | 500 | $8 \times 10^{10}$ | $1 \times 10^{11}$ | ⊙ |
| 21 | 350 | 43 | 510 | $6 \times 10^{10}$ | $8 \times 10^{10}$ | ⊙ |
| 22 | 350 | 42 | 510 | $8 \times 10^{10}$ | $8 \times 10^{10}$ | ⊙ |
| 23 | 350 | 43 | 510 | $7 \times 10^{10}$ | $7 \times 10^{10}$ | ⊙ |
| Comparative Examples | | | | | | |
| 13 | 280 | 39 | 490 | $9 \times 10^{10}$ | $1 \times 10^{11}$ | ◯ |
| 14 | 280 | 40 | 490 | $8 \times 10^{10}$ | $9 \times 10^{10}$ | ◯ |
| 15 | 280 | 39 | 490 | $7 \times 10^{10}$ | $7 \times 10^{10}$ | ◯ |
| 16 | 280 | 41 | 500 | $7 \times 10^{10}$ | $7 \times 10^{10}$ | ◯ |
| 17 | 300 | 38 | 500 | $1 \times 10^{11}$ | $2 \times 10^{11}$ | ◯ |
| 18 | 260 | 35 | 510 | $5 \times 10^{11}$ | $5 \times 10^{11}$ | ◯ |
| 19 | 280 | 38 | 490 | $1 \times 10^{11}$ | $3 \times 10^{11}$ | ◯ |
| 20 | 280 | 38 | 500 | $5 \times 10^{11}$ | $6 \times 10^{11}$ | ◯ |
| 21 | 280 | 35 | 480 | $7 \times 10^{10}$ | $8 \times 10^{10}$ | ◯ |
| 22 | 280 | 34 | 480 | $3 \times 10^{10}$ | $3 \times 10^{10}$ | ◯ |

*: Measured under nitrogen stream

Preparation of Master Batches 2

EXAMPLES 24 and 25

Polymers (A), (B) and (C) were blended in proportions shown in Table 11 for 3 minutes by using a Henschel mixer, followed by being melt kneaded by using a vented double-screw extuder under a condition of 280° C., 100 rpm and a residence time of 5 minutes to obtain master batches M-9 and M-10 of Examples 24 and 25, respectively.

TABLE 11

| Examples | Master Batch | (A) A-5 | (B) B-5* | (C) C-3 |
|---|---|---|---|---|
| 24 | M-9 | 45 | 40 | 15 |
| 25 | M-10 | 60 | 20 | 20 |

Proportions of Respective Components in Composition (%)

*B-5: PC/ABS (Polycarbonate resin/ABS resin alloy) (Multilon T-300 manufactured by Teijin Chemicals, Inc.)

EXAMPLES 26 and 27

The master batches M-9 and M-10 were respectively blended with B-5 under the same condition as described in Example 24 followed by kneading to obtain the resin compositions of the invention. The constitutions and proportions of the resin compositions of the invention by way of the master batches are tabulated in Table 12.

TABLE 12

| Examples | Master Batch Components Used Numbers in Parentheses Denote Parts By Weight | Proportions of Respective Components in Compositions By Way of Master Batch (%) | | | Contents of Metal Salts in Composition |
|---|---|---|---|---|---|
| | | (A) A-5 | (B) B-5 | (C) C-3 | (%) D-2* |
| 26 | M-9 (33.3) | 15 | 80 | 5 | 0.18 |
| 27 | M-10 (25) | 15 | 80 | 5 | 0.18 |

*D-2: Sodium Chloride (added while preparing the polyetheresteramide)

Examples 28 and 29 and Comparative Examples 23 and 24

The polymers (A), (B) and (C) or (A), (B), (C) and (E) shown in Table 13 were blended respectively under the same condition as described in Example 24 followed by kneading to obtain the resin compositions of the invention and the resin compositions for comparison.

cylinder temperature of 270° C. and a mold temperature of 70° C., which were then tested for mechanical properties and antistatic property. The results of the measurements are tabulated in Table 14. The tests for antistatic property were carried out by measuring the surface resistivity of the test pieces after having been treated and conditioned as described below.

Not water washed, wherein the test pieces, after having been molded, were held in an atmosphere of 20° C. and 65% RH for 24 hours.

Water washed, wherein the test pieces, after having been molded, were washed with an aqueous solution of a detergent (Mamalemon manufactured by Lion, Inc.) followed by washing with ion-exchanged water and drying to remove surface moisture, and then held in an atmosphere of 20° C. and 65% RH for 24 hours.

TABLE 14

| | Temperature of Starting Weight Loss* (°C.) | Izod Impact Strength (Kg · cm/cm) | Tensile Strength (Kg/cm$^2$) | Surface Resistivity | | Compatibility |
|---|---|---|---|---|---|---|
| | | | | Not Water Washed (Ω) | Water Washed (Ω) | |
| Examples | | | | | | |
| 26 | 330 | 67 | 580 | $1 \times 10^{11}$ | $2 \times 10^{11}$ | ◉ |
| 27 | 330 | 68 | 580 | $2 \times 10^{11}$ | $2 \times 10^{11}$ | ◉ |
| 28 | 330 | 66 | 570 | $5 \times 10^{11}$ | $7 \times 10^{11}$ | ◉ |
| 29 | 320 | 65 | 570 | $7 \times 10^{10}$ | $9 \times 10^{10}$ | ◉ |
| Comparative Examples | | | | | | |
| 23 | 350 | 70 | 600 | $10^{16}<$ | $10^{16}<$ | — |
| 24 | 280 | 65 | 560 | $6 \times 10^{11}$ | $7 \times 10^{11}$ | ○ |

*Measured under air stream

Preparation of Master Batches 3

Examples 30 to 34 and Comparative Examples 25 and 26

The polymers (A), (B) and (C) were blended in proportions shown in Table 15 for 3 minutes by using a Henschel mixer, followed by being melt kneaded using a vented double-screw extruder under a condition of 240° C., 30 rpm and a residence time of 5 minutes to obtain master batches M-11 to M-17 Examples 30 to 34 and Comparative Examples 25 and 26, respectively.

TABLE 13

| | Proportions of Respective Components in Compositions (%) | | | | Contents of Metal Salts in Composition (%) |
|---|---|---|---|---|---|
| | (A) | | (B) | (C) | (E) | |
| | A-3 | A-8 | B-5 | C-1 | E-1* | D-1 |
| Examples | | | | | | |
| 28 | 15 | 0 | 80 | 5 | — | 0.09 |
| 29 | 10 | 0 | 85 | 4 | 1 | 0.06 |
| Compatative Examples | | | | | | |
| 23 | 0 | 0 | 100 | 0 | — | — |
| 24 | 0 | 15 | 80 | 5 | — | 0.27 |

*E-1: Anionic surfactant (Chemistat 3033 manufactured by Sanyo Chemical Industrie, Inc.)

Performance Tests

Test pieces were prepared by injection-molding the resin compositions of examples 26 to 29, Comparative Examples 23 and 24 and the resin compositions for comparison at a

TABLE 15

| | Master Batch | (A) | (B) | | (C) |
|---|---|---|---|---|---|
| Examples | | | | | |
| 30 | M-11 | A-5 (54) | B-2 (18) | B-4 (10) | C-5 (18) |
| 31 | M-12 | A-3 (54) | B-2 (18) | B-4 (10) | C-6 (18) |
| 32 | M-13 | A-4 (40) | B-2 (40) | — | C-4 (20) |
| 33 | M-14 | A-4 (54) | B-2 (18) | B-4 (10) | C-5 (18) |
| 34 | M-15 | A-2 (20) | B-2 (20) | B-4 (50) | C-6 (10) |

TABLE 15-continued

|  | Master Batch | (A) | (B) |  | (C) |
|---|---|---|---|---|---|
| Comnparative Examples |  |  |  |  |  |
| 25 | M-16 | A-8 (20) | B-2 (20) | B-4(50) | C-4 (10) |
| 26 | M-17 | A-8 (40) | B-2 (40) | — | C-5 (20) |

Numbers Denote Proportions of Respective Components in Composition (%)

Examples 35 to 39 and Comparative Examples 27 and 28

The master batches M-11 to M-17 were respectively blended with B-2 and B-4, C-4 to C-6 and metal salts described in Table 16 followed by kneading under the same condition as described in Example 30 to obtain the resin compositions of the invention. The constitutions and proportions of the resin compositions of the invention by way of master batches are tabulated in Table 16.

TABLE 16

| | Master Batch Components Used Numbers in Parentheses Denote Parts By Weight | Proportions of Respective Components in Compositions by Way of Master Batch (%) | | | Contents of Metal Salts in Composition (%) |
|---|---|---|---|---|---|
| | | (A) | (B) | (C) | |
| Examples | | | | | |
| 35 | M-11 (27.7) | A-5 (15) | B-2 (5) B-4 (75) | C-5 (5) | D-2 (0.18) |
| 36 | M-12 (27.7) | A-3 (15) | B-2 (5) B-4 (75) | C-6 (5) | D-1 (0.09) |
| 37 | M-13 (25) | A-4 (10) | B-2 (10) B-4 (75) | C-4 (5) | — |
| 38 | M-14 (27.7) | A-4 (15) | B-2 (5) B-4 (75) | C-5 (5) | D-3* (0.05) |
| 39 | M-15 (50) | A-2 (10) | B-2 (10) B-4 (75) | C-6 (5) | — |
| Comparative Example: | | | | | |
| 27 | M-16 (50) | A-8 (10) | B-2 (10) B-4 (75) | C-4 (5) | D-1 (0.18) |
| 28 | M-17 (25) | A-8 (10) | B-2 (10) B-4 (75) | C-5 (5) | D-1 (0.18) |

*D-3: Potassium chloride (added in kneading by using a double-screw extruder)

Examples 40 to 45 and Comparative Examples 29 to 35

The polymers (A) to (C) described in Table 17, or (A) to (C) and metal salts described in Table 17 were blended and kneaded under the same condition as in Example 30 to obtain the resin compositions of the invention and the resin compositions for comparison.

TABLE 17

| | Respective Components and Proportions in Compositions (%) | | | Contents of Metal Salts in Composition (%) |
|---|---|---|---|---|
| | (A) | (B) | (C) | |
| Examples | | | | |
| 40 | A-5 (15) | B-2(5) B-4 (75) | C-5 (5) | D-2 (0.18) |
| 41 | A-3 (20) | B-2 (5) B-4 (70) | C-6 (5) | D-1 (0.12) |
| 42 | A-4 (20) | B-2 (10) B-4 (65) | C-4 (5) | D-4*** (0.05) |
| 43 | A-4 (15) | B-2 (5) B-4 (75) | C-4 (5) | — |
| 44 | A-4 (15) | B-2 (5) B-4 (75) | C-5 (5) | D-3** (0.05) |
| 45 | A-2 (15) | B-2 (10) B-4 (70) | C-6 (5) | — |
| Comparative Examples | | | | |
| 29 | A-8 (10) | B-2 (10) B-4 (75) | C-4 (5) | D-1 (0.18) |

TABLE 17-continued

| | Respective Components and Proportions in Compositions (%) | | | Contents of Metal Salts in Composition (%) |
|---|---|---|---|---|
| | (A) | (B) | (C) | |
| 30 | A-8 (10) | B-2 (10) B-4 (75) | C-5 (5) | D-1 (0.18) |
| 31 | A-6 (10) | B-2 (10) B-4 (75) | C-4 (5) | D-4 (0.15) |
| 32 | A-6 (10) | B-2 (10) B-4 (75) | C-5 (5) | D-3 (0.10) |
| 33 | A-6 (15) | B-2 (5) B-6* (75) | C-5 (5) | D-3 (0.10) |
| 34 | A-6 (20) | B-2 (5) | C-6 (5) | D-4 (0.20) |

TABLE 17-continued

| | Respective Components and Proportions in Compositions (%) | | | Contents of Metal Salts in Composition (%) |
|---|---|---|---|---|
| | (A) | (B) | (C) | |
| 35 | A-6 (10) | B-4 (70) B-2 (10) B-4 (75) | C-4 (5) | — |

*B-6: Polypropylene resin (UBE Polypro J385 manufactured by UBE Industries, Inc.)
**D-3: Sodium chloride (added while kneading by using a double-axis extruder)
***D-4: Potassium chloride (added while kneading by using a double-axis extruder)

Performance Tests

Test pieces were prepared by injection-molding the resin compositions of Examples 35 to 45, Comparative Examples 27 to 35 and the resin compositions for comparison at a cylinder temperature of 240° C. and a mold temperature of 60° C., which were then tested for mechanical properties and antistatic property. The results of the measurements are tabulated in Table 18. The tests for antistatic property were carried out by measuring the surface resistivity of the test pieces after having been treated and conditioned as described below.

Not water washed, wherein the test pieces, after having been molded, were held in an atmosphere of 20° C. and 50% RH for 24 hours.

Water washed, wherein the test pieces, after having been molded, were washed with an aqueous solution of a detergent (Mamalemon manufactured by Lion, Inc.) followed by washing with ion-excahanged water and drying to remove surface moisture, and then held in an atmosphere of 20° C. and 50% RH for 24 hours.

Preparation of Master Batches 4

Examples 46 and 47 and Comparative Example 36

The polymers (A) to (C) were blended in proportions shown in Table 19 for 3 minutes by using a Henschel mixer, followed by being melt kneaded using a vented double-screw extruder under a condition of 240° C., 100 rpm and a residence time of 5 minutes to obtain master batches M-18 to M-20 of Examples 46 and 47 and Comparative Examples 36, respectively.

TABLE 19

| | Master Batch | (A) | (B) | | (C) |
|---|---|---|---|---|---|
| Examples | | | | | |
| 46 | M-18 | A-2 (50) | B-3 (25) | B-4 (20) | C-4 (5) |
| 47 | M-19 | A-2 (62.5) | B-3 (31.25) | — | C-5 (6.25) |
| Com. Ex. 36 | M-20 | A-6 (50) | B-3 (25) | B-7* (20) | C-7 (20) |

Numbers Denote Proportions of Respective Components in Composition (%)

*B-7: Polyethylene resin (Staflene E 750(C) manufactured by Nippon Petroleum Chemicals, Inc.)

Examples 48 to 50 and Comparative Example 37

The master batches M-18 to M-20 were respectively blended with B-3, B-4 or B-7 shown in Table 19 followed by kneading under the same condition as described in Example 46 to obtain the resin compositions of the invention. The constitutions and proportions of the resin compositions of the invention by way of master batches are tabulated in Table 20.

TABLE 18

| | Temperature of Starting Weight Loss* (°C.) | Izod Impact Strength (Kg · cm/cm) | Flexural Modulus (Kg/cm²) | Surface Resistivity | | Compatibility |
|---|---|---|---|---|---|---|
| | | | | Not Water Washed (Ω) | Water Washed (Ω) | |
| Examples | | | | | | |
| 35 | 280 | 14 | 13,500 | $3 \times 10^{10}$ | $4 \times 10^{10}$ | ⊚ |
| 36 | 280 | 15 | 13,500 | $3 \times 10^{10}$ | $3 \times 10^{10}$ | ⊚ |
| 37 | 275 | 14 | 13,000 | $3 \times 10^{11}$ | $3 \times 10^{11}$ | ⊚ |
| 38 | 270 | 14 | 13,500 | $3 \times 10^{10}$ | $4 \times 10^{10}$ | ⊚ |
| 39 | 280 | 14 | 13,500 | $2 \times 10^{11}$ | $4 \times 10^{11}$ | ⊚ |
| 40 | 275 | 14 | 13,000 | $9 \times 10^{11}$ | $1 \times 10^{12}$ | ⊚ |
| 41 | 280 | 15 | 12,000 | $3 \times 10^{10}$ | $4 \times 10^{10}$ | ⊚ |
| 42 | 270 | 16 | 13,000 | $3 \times 10^{11}$ | $3 \times 10^{11}$ | ⊚ |
| 43 | 280 | 13 | 12,000 | $2 \times 10^{11}$ | $2 \times 10^{11}$ | ⊚ |
| 44 | 270 | 13 | 13,000 | $7 \times 10^{10}$ | $6 \times 10^{10}$ | ⊚ |
| 45 | 280 | 17 | 13,500 | $1 \times 10^{11}$ | $1 \times 10^{11}$ | ⊚ |
| Comparative Examples | | | | | | |
| 27 | 255 | 14 | 13,000 | $4 \times 10^{11}$ | $5 \times 10^{11}$ | ○ |
| 28 | 255 | 12 | 13,000 | $1 \times 10^{11}$ | $1 \times 10^{11}$ | ○ |
| 29 | 260 | 14 | 13,000 | $6 \times 10^{11}$ | $6 \times 10^{11}$ | ○ |
| 30 | 250 | 13 | 13,000 | $3 \times 10^{11}$ | $3 \times 10^{11}$ | ○ |
| 31 | 255 | 12 | 12,000 | $8 \times 10^{11}$ | $9 \times 10^{11}$ | ○ |
| 32 | 255 | 12 | 12,500 | $5 \times 10^{11}$ | $5 \times 10^{11}$ | ○ |
| 33 | 260 | 5 | 11,000 | $2 \times 10^{11}$ | $3 \times 10^{11}$ | ○ |
| 34 | 250 | 12 | 12,000 | $2 \times 10^{10}$ | $2 \times 10^{10}$ | ○ |
| 35 | 250 | 13 | 13,500 | $1 \times 10^{11}$ | $1 \times 10^{11}$ | ○ |

*Measured under air stream

TABLE 20

| Master Batch Numbers in Parentheses Denote Parts By Weight | Proportions of Respective Components in Compositions by Way of Master Batch (%) | | |
|---|---|---|---|
| | (A) | (B) | (C) |
| Examples | | | |
| 48 | M-18 (20) | A-2 (10) | B-3 (5)  B-4 (84) | C-4 (1) |
| 49 | M-18 (40) | A-2 (20) | B-3 (10) B-4 (68) | C-4 (2) |
| 50 | M-19 (16) | A-2 (10) | B-3 (5)  B-4 (84) | C-5 (1) |
| Com. Ex. 37 | M-20 (40) | A-6 (20) | B-3 (10) B-7 (68) | C-7 (2) |

Examples 51 to 54 and Comparative Example 38

The polymers (A), (B) and (C) were blended in proportions shown in Table 21 followed by kneading under the same condition as described in Example 46 to obtain the resin compositions of the invention and the resin compositions for comparison.

TABLE 21

| | (A) | (B) | | (C) |
|---|---|---|---|---|
| Examples | | | | |
| 51 | A-2 (10) | B-3 (5)  | B-4 (84)  | C-4 (1) |
| 52 | A-2 (20) | B-3 (10) | B-4 (68)  | C-4 (2) |
| 53 | A-2 (10) | B-3 (5)  | B-4 (84)  | C-6 (1) |
| 54 | A-2 (28) | B-7 (60) | B-8* (10) | C-7 (2) |
| Com. Ex. 38 | A-6 (20) | B-3 (10) | B-7 (68) | C-7 (2) |

Numbers in Parentheses Denote Proportions of Respective Components in Composition (%)

*B-8: Polyacetal resin (Duracon M 90 manufactured by Polyplastics, Inc.)

Performance Tests

Test pieces were prepared by injection-molding the resin compositions of Examples 48 to 54, Comparative Examples 37 and and the compositions for comparison at a cylinder temperature of 240° C. and a mold temperature of 50° C., which were then tested for mechanical properties and antistatic property. The results of the measurements are tabulated in Table 22. The tests for antistatic property were carried out by measuring the surface resistivity of the test pieces after having been treated and conditioned as described below.

Not water washed, wherein the test pieces, after having been molded, were held in an atmosphere of 20° C. and 50% RH for 24 hours.

Water washed, wherein the test pieces, after having been molded, were washed with an aqueous solution of a detergent (Mamalemon manufactured by Lion, Inc.) followed by washing with ion-excahanged water and drying to remove surface moisture, and then held in an atmosphere of 20° C. and 50% RH for 24 hours.

TABLE 22

| | Temperature of Starting Weight Loss* (°C.) | Izod Impact Strength (Kg · cm/cm) | Flexural Modulus (Kg/cm$^2$) | Surface Resistivity | | Compatibility |
|---|---|---|---|---|---|---|
| | | | | Not Water Washed (Ω) | Water Washed (Ω) | |
| Ex. 48 | 280 | 15 | 13,000 | $3 \times 10^{11}$ | $5 \times 10^{11}$ | ⊚ |
| Ex. 49 | 280 | 18 | 13,500 | $8 \times 10^{10}$ | $7 \times 10^{10}$ | ⊚ |
| Ex. 50 | 275 | 15 | 13,000 | $2 \times 10^{11}$ | $2 \times 10^{11}$ | ⊚ |
| Ex. 51 | 270 | 13 | 12,000 | $5 \times 10^{11}$ | $7 \times 10^{11}$ | ⊚ |
| Ex. 52 | 280 | 13 | 12,500 | $1 \times 10^{11}$ | $1 \times 10^{11}$ | ⊚ |
| Ex. 53 | 275 | 12 | 12,500 | $1 \times 10^{11}$ | $2 \times 10^{11}$ | ⊚ |
| Ex. 54 | 280 | 9  | 12,000 | $2 \times 10^{11}$ | $3 \times 10^{11}$ | ⊚ |
| Com. Ex. 37 | 255 | 8 | 12,000 | $9 \times 10^{10}$ | $9 \times 10^{10}$ | ○ |
| Com. Ex. 38 | 255 | 6 | 11,500 | $7 \times 10^{11}$ | $8 \times 10^{11}$ | ○ |

*: Measured under air stream

We claim:

1. A resin composition comprising:
   (A) at least 97% by weight based on the total composition of a polyetheresteramide consisting essentially of residues derived from (1) a polyamide oligomer having end units containing a carboxylic group and having a number average molecular weight from 200 to 5,000 and (2) an oxyalkylated bisphenol compound having a number average molecular weight from 300 to 3,000; and
   (B) at least 0.01% by weight based on the total composition of a halide of an alkali metal or an alkaline earth metal.

2. The composition of claim 1, wherein the halide of an alkali metal is sodium chloride or potassium chloride.

3. The resin composition according to claim 1, wherein said carboxylic group is derived from adipic, sebacic, terephthalic or isophthalic acids or 3-sulfoisophthalic acid alkali metal.

4. The resin composition according to claim 1, wherein said oxyalkylated bisphenol compound comprises an oxyalkylated alkylidene bisphenol.

5. The resin composition according to claim 4, wherein said oxyalkylated alkylidene bisphenol is an oxyalkylated bisphenol A.

6. The resin composition according to claim 1, wherein said oxyalkylated bisphenol compound is contained in the molecule in an amount of from 20 to 80% by weight of the polyetheresteramide.

7. The resin composition according to claim 1 wherein the polyetheresteramide has a relative viscosity of from 0.6 to 3.0 measured as a 0.5% by weight solution of the polyetheresteramide in m-cresol at 25° C.

8. The resin composition according to claim 1, wherein said oxyalkylated bisphenol compound is an oxyalkylated derivative of a bisphenol compound having the formula (1):

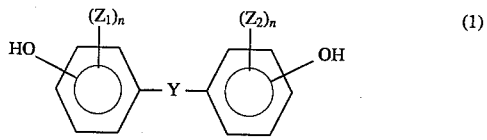

wherein $Z_1$ and $Z_2$ are the same or different, and are selected from the group consisting of alkyl groups containing 1 to 4 carbon atoms, aralkyl groups containing 6 to 10 carbon atoms, aryl groups, and halogen atoms; Y is selected from the group consisting of a covalent bond, an alkylidene group, an aryl alkylidene group, oxygen, sulfur, a sulfonyl group, a bistrifluoromethyl methylene group, and a carbonyl group; and n and m are independently integers from 0 to 4.

9. The resin composition according to claim 1, wherein said oxyalkylated bisphenol compound is an oxyalkylated derivative of a bisphenol compound selected from the group consisting of dihydroxydiphenyl, a C-alkyl substituted bisphenol, a halogenated bisphenol, an alkylene bisphenol, an alkylidene bisphenol, cyclohexylidene bisphenol, bistrifluoromethyl methylene bisphenol, an arylalkylidene bisphenol, bisphenol S, and hydroxybenzophenone.

10. The resin composition according to claim 1, wherein said oxyalkylated bisphenol compound contains from 32 to 60 oxyethylene units.

11. The resin composition according to claim 1, wherein said oxyalkylated bisphenol compound has a number average molecular weight of 1,600 to 3,000.

12. The resin composition according to claim 1, wherein said polyetheresteramide has a relative viscosity in the range of 0.5 to 4.0, measured as a 0.5% by weight solution in m-cresol at 25° C.

13. The resin composition according to claim 1, wherein said halide is a halide of an alkali metal.

14. The resin composition according to claim 1, wherein said halide is present in an amount of from 0.01 to 3% by weight.

* * * * *